United States Patent
Nishiyama et al.

(10) Patent No.: US 10,230,115 B2
(45) Date of Patent: Mar. 12, 2019

(54) METALLIC MATERIAL, AND CONDUCTIVE COMPONENT INCLUDING THE SAME

(71) Applicant: NIPPON STEEL & SUMITOMO METAL CORPORATION, Tokyo (JP)

(72) Inventors: Yoshitaka Nishiyama, Tokyo (JP); Junko Imamura, Tokyo (JP); Yasuhiro Masaki, Tokyo (JP); Masanari Kimoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/500,869

(22) PCT Filed: Aug. 18, 2015

(86) PCT No.: PCT/JP2015/073121
§ 371 (c)(1),
(2) Date: Jan. 31, 2017

(87) PCT Pub. No.: WO2016/027802
PCT Pub. Date: Feb. 25, 2016

(65) Prior Publication Data
US 2017/0237084 A1 Aug. 17, 2017

(30) Foreign Application Priority Data
Aug. 19, 2014 (JP) .................................. 2014-166877

(51) Int. Cl.
*H01M 8/02* (2016.01)
*H01M 8/0228* (2016.01)
(Continued)

(52) U.S. Cl.
CPC ........... *H01M 8/0228* (2013.01); *C23C 28/32* (2013.01); *C23C 28/345* (2013.01);
(Continued)

(58) Field of Classification Search
None
See application file for complete search history.

(56) References Cited

U.S. PATENT DOCUMENTS

2004/0247978 A1* 12/2004 Shimamune .............. C25B 9/10
429/518
2013/0175165 A1 7/2013 Okazaki et al.

FOREIGN PATENT DOCUMENTS

CN 101519779 A 9/2009
EA 018575 B1 9/2013
(Continued)

OTHER PUBLICATIONS

Extended European Search Report, dated Dec. 5, 2017, for corresponding European Application No. 15833921.8.
(Continued)

*Primary Examiner* — Maria Laios
*Assistant Examiner* — Angela J Martin
(74) *Attorney, Agent, or Firm* — Birch, Stewart, Kolasch & Birch, LLP (57) ABSTRACT

Provided is a metallic material including: a base metal made of a metal; a metal compound layer stacked on a surface of the base metal, the metal compound layer mainly containing a compound of at least one transition metal in the fourth period and oxygen; a platinum group portion dispersed on a surface of the metal compound layer, the platinum group portion mainly containing at least one platinum group element; and a platinum group compound coating film which covers the platinum group portion, the platinum group compound coating film mainly containing a compound of at least one platinum group element and oxygen. The at least one platinum group element contained in the platinum group portion is preferably one or more of Ru, Rh, Os, and Ir.

8 Claims, 2 Drawing Sheets

(51) Int. Cl.
*H01M 8/0206* (2016.01)
*H01M 8/0215* (2016.01)
*C23C 28/00* (2006.01)
*H01M 8/1018* (2016.01)

(52) U.S. Cl.
CPC ....... *H01M 8/0206* (2013.01); *H01M 8/0215* (2013.01); *H01M 2008/1095* (2013.01)

(56) References Cited

FOREIGN PATENT DOCUMENTS

| | | | | |
|---|---|---|---|---|
| EP | 2096698 | * | 9/2009 | ............. H01M 8/02 |
| EP | 2096698 A1 | | 9/2009 | |
| JP | 10-228914 A | | 8/1998 | |
| JP | 11-162479 A | | 6/1999 | |
| JP | 2002-343373 A | | 11/2002 | |
| JP | 2003-105523 A | | 4/2003 | |
| JP | 2004-71321 A | | 3/2004 | |
| JP | 2005-154805 A | | 6/2005 | |
| JP | 2005154805 | * | 6/2005 | ............. C23C 18/06 |
| JP | 2006-97088 A | | 4/2006 | |
| JP | 2006-190643 A | | 7/2006 | |
| JP | 2007-59375 A | | 3/2007 | |
| JP | 2008-108490 A | | 5/2008 | |
| JP | 2009-102676 A | | 5/2009 | |
| JP | 2013-237934 A | | 11/2013 | |
| KR | 10-2004-0035820 A | | 4/2004 | |
| RU | 2378743 C1 | | 1/2010 | |
| WO | WO 2012/036196 A1 | | 3/2012 | |
| WO | WO 2013/073076 A1 | | 5/2013 | |

OTHER PUBLICATIONS

International Search Report for PCT/JP2015/073121 (PCT/ISA/210) dated Sep. 29, 2015.
Written Opinion of the International Searching Authority for PCT/JP2015/073121 (PCT/ISA/237) dated Sep. 29, 2015.
Korean Office Action, dated May 18, 2018, for corresponding Korean Application No. 10-2017-7004462, with Partial English Translation.
Chinese Office Action and Search Report, dated Jun. 6, 2018, for corresponding Chinese Application No. 201580044041.3, with a partial English translation of the Chinese Office Action.
Russian Office Action and Search Report dated Mar. 13, 2018 for Russian Application No. 2017103299/02, with English translation.
Canadian Office Action, dated Jul. 23, 2018, for corresponding Canadian Application 2,955,125.
Canadian Office Action dated Jan. 25, 2018 for corresponding Canadian Application No. 2,955,125.

* cited by examiner

METALLIC MATERIAL, AND CONDUCTIVE COMPONENT INCLUDING THE SAME

TECHNICAL FIELD

The present invention relates to a metallic material, and a conductive component (for example, a fuel cell separator and an electrode) including the metallic material.

BACKGROUND ART

Since a fuel cell utilizes energy generated during a binding reaction between hydrogen and oxygen, fuel cells contributes to a next-generation power generation system whose introduction and widespread use are expected from the viewpoint of energy-saving and environmental measures. Examples of the fuel cells include a solid electrolyte fuel cell, a molten carbonate fuel cell, a phosphoric acid fuel cell, and a solid polymer electrolyte fuel cell.

Of those, the solid polymer electrolyte fuel cell has high output density, is capable of being reduced in size, operates in lower temperature than other types of fuel cells, and is easily started and stopped. From those advantages, use of solid polymer electrolyte fuel cells for small-sized cogeneration for automobiles and homes has been expected, and has recently been drawing attention particularly.

Figure 1:
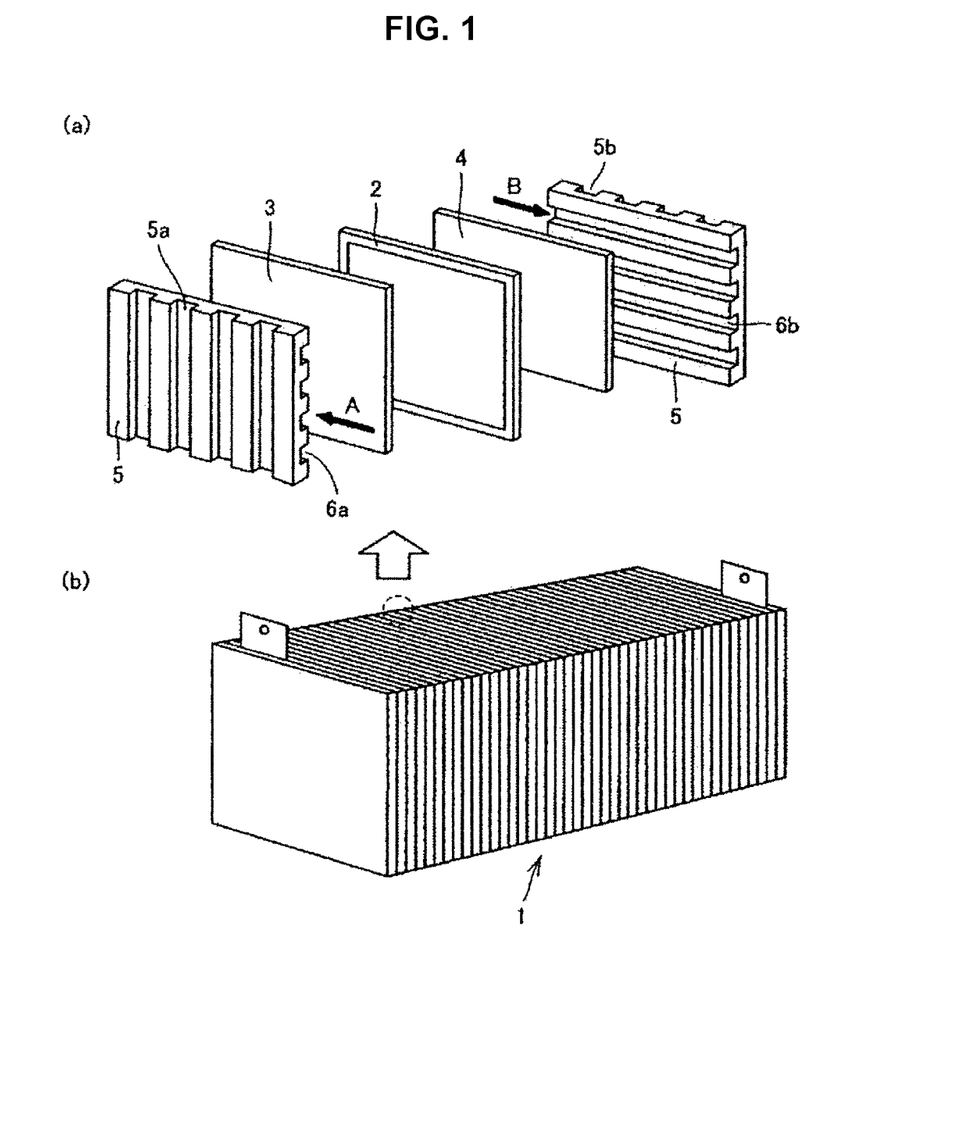
FIG. 1 is a diagram schematically showing a structure of a solid polymer electrolyte fuel cell.

FIG. 1 is a diagram showing a structure of a solid polymer electrolyte fuel cell (hereinafter, may also be simply referred to as "fuel cell"). FIG. 1(a) is an exploded perspective view of a single cell included in the fuel cell, and FIG. 1(b) is a perspective view of an entire fuel cell made by combining multiple single cells.

As shown in FIG. 1, a fuel cell 1 is a stack of single cells. As shown in FIG. 1(a), viewing a single cell, an anode-side gas diffusion layer (also called "fuel electrode film", hereinafter, referred to as "anode") 3 is stacked on one side of a solid polymer electrolyte membrane 2, and a cathode-side gas diffusion layer (also called "oxidizing agent electrode film", hereinafter, referred to as "cathode") 4 is stacked on the other side of the solid polymer electrolyte membrane 2; and on the both sides thereof, separators (bipolar plates) 5a and 5b are stacked, respectively.

Some fuel cells have separators having a gas flow channel for cooling water to pass through, each separator being placed between two adjacent single cells or every several single cells. The present invention also targets at such a water-cooled fuel cell separator.

As a solid polymer electrolyte membrane (hereinafter, simply referred to as "electrolyte membrane") 2, mainly used is a fluorine-based proton conductive membrane having a hydrogen ion (proton)-exchange group.

As each of the anode 3 and the cathode 4, mainly used is a carbon sheet (or carbon paper having a thickness smaller than the thickness of the carbon sheet, or a carbon cloth having a thickness smaller than the thickness of the carbon paper) obtained by rendering conductive carbon fibers into a sheet shape. There are cases where the anode 3 and the cathode 4 are each provided with a catalyst layer including a particle-shaped platinum catalyst, graphite powder, and, as necessary, a fluorine resin having a hydrogen ion (proton)-exchange group. In those cases, fuel gas or oxidizing gas comes into contact with the catalyst layer and the reaction is promoted.

Regarding the separator 5a, on the surface of the side of the anode 3, a flow path 6a having a groove shape is formed. Fuel gas (hydrogen or hydrogen-containing gas) A flows through the flow path 6a, and the anode 3 is supplied with hydrogen. Regarding the separator 5b, on the surface of the side of the cathode 4, a flow path 6b having a groove shape is formed. Oxidizing gas B such as air flows through the flow path 6b, and the cathode 4 is supplied with oxygen. Supplying of those gases causes an electrochemical reaction to occur and direct-current power to be generated.

Main functions that a separator of a solid polymer electrolyte fuel cell is demanded to have are as follows.

(1) A function as a "flow path" for supplying uniformly a surface of the cell with fuel gas or oxidizing gas.

(2) A function as a "flow path" for efficiently discharging water generated at the cathode side outside the system from the fuel cell together with air generated after reaction and a carrier gas such as oxygen.

(3) A function to be a passage for electricity by being in contact with the electrode films (anode 3 and cathode 4) and to be an electrical "connector" between two adjacent single cells.

(4) A function as a "partition wall" between, of adjacent cells, an anode chamber of one cell and a cathode chamber of the other cell.

(5) In a water-cooled fuel cell, a function as a "partition wall" between a cooling water flow path and an adjacent cell.

It is necessary that a material of a base material of a separator for a solid polymer electrolyte fuel cell (hereinafter, simply referred to as "separator") be able to achieve those functions. The materials of a base material is roughly classified into metal-based materials and carbon-based materials. Using a carbon-based material, there is an advantage in that a lightweight separator can be obtained, but there are problems that the carbon-based material has gas permeability (the function as a partition wall is limited) and that the mechanical strength is low.

Examples of the metal-based materials include titanium, stainless steel, and carbon steel. The separator made of those metal-based materials is manufactured by press working and the like. The metal-based materials have, as characteristics unique to metals, advantages that processability is excellent, the thickness of the separator can be decreased, and that the weight of the separator is reduced, but has a risk that the electrical conductivity may decrease due to oxidation of the metal surface. Accordingly, there arises a problem that contact resistance between a separator made of a metal-based material and a gas diffusion layer may increase. In regard to this problem, the following measures are proposed.

Patent Literature 1 proposes a separator in which a surface of a metal member is plated with gold. Patent Literature 2 proposes a separator in which a noble metal thin film layer is formed on a surface of a metal base material.

The separators of Patent Literatures 1 and 2 each include a large amount of a noble metal. Accordingly, a separator in which an amount of gold included is reduced by performing plating with a noble metal partially is proposed. For example, Patent Literature 3 discloses a metal separator including a surface having corrosion resistance and a conductive inclusion shown above the surface, wherein an area other than an area in which the conductive inclusion is shown is covered with gold. Patent Literature 4 discloses a structure (separator) including a gold-plated portion and a non-plated portion on a surface of a titanium base material.

The following are separators which do not include gold. Patent Literature 5 proposes a titanium alloy whose increase in contact resistance is suppressed by pickling a titanium alloy containing one or more platinum group elements and concentrating the platinum group elements on a surface. Patent Literature 6 proposes a titanium separator in which platinum group element(s) is(/are) concentrated on a surface through pickling, and then, in order to improve adhesion between the platinum group element(s) concentrated on the surface and a matrix, heat treatment is performed in a low oxygen concentration atmosphere.

The following are a separator and an electrode, in which a conductive substance is dispersed (scattered) on a surface. Patent Literature 7 discloses a separator in which a metal coating film containing conductive ceramics is formed on a surface. The conductive ceramics are dispersed in the metal coating film. Patent Literature 8 discloses an electrode for electrolysis including a surface layer made of a metal oxide film, wherein a layer immediately under the surface layer includes noble metal(s), and, at an outer layer portion, the noble metal(s) is(/are) precipitated and dispersed in grain boundaries of the metal.

Patent Literature 9 discloses a separator obtained by forming a concave flow path on a titanium substrate, then forming a plated layer made of noble metal(s) such as Au and/or Pt on a substrate, and further performing heat treatment at 300 to 800° C. Patent Literature 10 discloses a corrosion-resistant conductive covering material in which a platinum group metal-plated layer is formed on an outer layer of a metal substrate, and two intermediate layers are formed between the metal substrate and the plated layer, the two intermediate layers including, from the side of the metal substrate, a layer (A): a thin film made of oxides of metals in the fourth group and the fifth group; and a layer (B): a thin film containing platinum group metal(s) or the oxide(s) thereof.

CITATION LIST

Patent Literature

Patent Literature 1: JP H10-228914A
Patent Literature 2: JP 2003-105523A
Patent Literature 3: JP 2004-71321A
Patent Literature 4: JP 2006-97088A
Patent Literature 5: JP 2006-190643A
Patent Literature 6: JP 2007-59375A
Patent Literature 7: JP H11-162479A
Patent Literature 8: WO 2012/036196
Patent Literature 9: JP 2008-108490A
Patent Literature 10: JP 2009-102676A

SUMMARY OF INVENTION

Technical Problem

However, regarding each of the separators of Patent Literatures 1 to 6, when subjected to a process of being under an external pressure such as press molding during manufacturing, the layer of noble metal(s) may peel, and there are cases where corrosion resistance and conductivity cannot be ensured. Regarding the separator of Patent Literature 7, when a sheet material is press molded into a shape of the separator during manufacturing, the dispersed ceramics inhibits the molding, and there are cases where cracks or through-holes occur in the sheet material. In addition, since a die wears away by the ceramics, there occurs a problem that the die has to be made from an expensive material such as cemented carbide. Regarding the electrode of Patent Literature 8, since there is no noble metal on the surface, the conductivity is limited. Regarding the separator of Patent Literature 9, the adhesion between the plated layer and the base material is not sufficient, and when they are subjected to molding such as bending, the plated layer peels and falls off, hence, the conductivity decreases. Further, an oxide film containing crystalline titanium oxide is formed between the base material and the plated layer, but the adhesion between the oxide film and the plated layer is also not sufficient, and when they are subjected to bending and the like, the plated layer peels and falls off in the same manner, hence, the conductivity decreases. Regarding the corrosion-resistant conductive covering material of Patent Literature 10, the mixed layer of the layer of metal oxides and the layer of a platinum group or an oxide of a platinum group is formed between the platinum group metal-plated layer and the metal substrate, but the adhesion between the mixed layer and the platinum group metal-plated layer is not sufficient. Further, since the thickness of the layer of metal oxides is as large as 50 nm to 70 nm, even if the layer of a platinum group or an oxide of a platinum group is diffused and mixed, it is difficult to ensure sufficient conductivity.

Accordingly, an object of the present invention is to provide a metallic material having excellent corrosion resistance and excellent conductivity, and a conductive component including the metallic material.

Solution to Problem

The gist of the present invention is to provide the following metallic material (A) and the following conductive component (B).

(A) A metallic material according to an embodiment of the present invention includes:

a base metal made of a metal;

a metal compound layer stacked on a surface of the base metal, the metal compound layer mainly containing a compound of at least one transition metal in the fourth period and oxygen;

a platinum group portion dispersed on a surface of the metal compound layer, the platinum group portion mainly containing at least one platinum group element; and a platinum group compound coating film which covers the platinum group portion, the platinum group compound coating film mainly containing a compound of at least one platinum group element and oxygen.

(B) A conductive component according to an embodiment of the present invention includes the metallic material (A) mentioned above. The conductive component may be, for example, a fuel cell separator or an electrode.

Advantageous Effects of Invention

The metallic material according to the present invention has a surface on which the platinum group portion is dispersed, and hence has excellent corrosion resistance and conductivity. Further, the platinum group portion is covered with the platinum group compound coating film, and thus, the adhesion between the metal compound layer and the platinum group portion is improved. Accordingly, even when the metallic material is subjected to a process, the platinum group portion hardly falls off or peels. Therefore, the metallic material has excellent corrosion resistance and conductivity also after being subjected to a process.

The conductive component according to the present invention has, also after being subjected to a process, excellent corrosion resistance and conductivity.

DESCRIPTION OF EMBODIMENTS

In the present description, "the fourth period" represents the fourth period of the periodic table of elements, and the transition metals in the fourth period are Ti, V, Cr, Mn, Fe, Co, Ni, and Cu.

Regarding the metal compound layer, "mainly containing a compound of at least one transition metal in the fourth period and oxygen" represents the fact that the proportion of the compound of at least one transition metal in the fourth period and oxygen to the metal compound layer is more than 50 vol %.

Regarding the platinum group portion, "mainly containing at least one platinum group element" represents the fact that the proportion of the at least one platinum group element to the platinum group portion is more than 50 vol %.

Regarding the platinum group compound coating film, "mainly containing a compound of at least one platinum group element and oxygen" represents the fact that the proportion of the compound of at least one platinum group element and oxygen to the platinum group compound coating film is more than 50 vol %.

The inventors of the present invention have prepared the following metal sheets A and B, and have investigated change in contact resistance caused by repetitive bending on those metal sheets A and B.

A: a metal sheet in which a metal compound layer is stacked on a surface, the metal compound layer mainly containing a compound of at least one transition metal in the fourth period and oxygen.

B: a metal sheet including the metal sheet A, in which a platinum group portion is dispersed on a surface of the metal compound layer of the metal sheet A, the platinum group portion mainly containing at least one platinum group element.

The metal sheets each had a flat sheet shape.

Small pieces for measurement cut out from the metal sheets A and B, respectively, were each sandwiched with gold-plated electrodes via carbon sheets made of carbon fiber, and the contact resistance of each small piece was measured. As a result, the contact resistance of the small piece cut out from the metal sheet A was higher than the contact resistance of the small piece cut out from the metal sheet B. Consequently, it was found that the platinum group portion increases the conductivity on the surface of the metal sheet.

Next, a process of bending and then bringing back to the flat sheet shape was performed on each of the metal sheets A and B. After that, small pieces were cut out from the portions that have been bent repeatedly of the metal sheets A and B, respectively, and the contact resistance of each small piece was measured in the same manner as above. As a result, while the contact resistance of the small piece of the metal sheet A did not change greatly before and after bending, the contact resistance of the small piece of the metal sheet B remarkably increased by bending, which got closer to the contact resistance of the small piece of the metal sheet A. Further, the contact resistance of the small piece of the metal sheet B increased as the number of repetitions of bending increased.

Accordingly, the inventors of the present invention have investigated a cause of the above, and have found that, regarding the metal sheet B, the platinum group portion falls off by bending, and the amount of the platinum group portion on the metal compound layer decreases. It can be considered that this is because, when the adhesion between the metal compound layer and the platinum group portion is not sufficient and a large external force is applied to the metal sheet like the case of performing bending, the platinum group portion peels from the metal compound layer.

The inventors of the present invention have conducted intensive studies to solve the problem, and have found that the adhesion between the metal compound layer and the platinum group portion improves when a surface of the platinum group portion is covered with a platinum group compound coating film mainly containing a compound of platinum group element(s) and oxygen, and the platinum group compound coating film has a portion in contact with the metal compound layer. Although there are some unclear parts in the reason why the adhesion improves, the following is an assumed mechanism.

While the transition metal(s) and oxygen included in the metal compound layer are bonded to each other through an ionic bond, atoms of platinum group element(s) included in the platinum group portion are bonded to each other through a metallic bond. Accordingly, bonding strength of the contact interface between the metal compound layer and the platinum group portion is not necessarily high. On the other hand, in the case where the surface of the platinum group portion is covered with the platinum group compound coating film mainly containing a compound of platinum group element(s) and oxygen, the platinum group compound coating film and the metal compound layer each have a bonding mode of an ionic bond, and hence, the bonding therebetween is strengthened, that is, the adhesion force between the metal compound layer and the platinum group portion is assumed to be improved. It is considered that the bonding strength increases because, although principal cations of the metal compound layer and the principal cations of the platinum group compound coating film are different from each other, the bonding mode to oxygen in the metal compound layer is the same (ionic bond) as the bonding mode to oxygen in the platinum group compound coating film, and cations in any one of the metal compound layer and the platinum group compound coating film are diffused into the other, thereby replacing some of cations.

<Metallic Material>

The present invention has been accomplished on the basis of the following findings. A metallic material according to an embodiment of the present invention includes: a base metal made of a metal; a metal compound layer stacked on a surface of the base metal, the metal compound layer mainly containing a compound of at least one transition metal in the fourth period and oxygen; a platinum group portion dispersed on a surface of the metal compound layer, the platinum group portion mainly containing at least one platinum group element; and a platinum group compound coating film which covers the platinum group portion, the platinum group compound coating film mainly containing a compound of at least one platinum group element and oxygen.

Hereinafter, the structural elements of the metallic material according to the present embodiment will be described.

[Base Metal]

Metallic materials of the base metal are not particularly limited, and examples of the metal materials include ferritic stainless steel, austenitic stainless steel, two-phase stainless steel, pure Ti, a Ti-base alloy, pure Fe, a Fe-base alloy, pure Co, a Co-base alloy, pure Ni, a Ni-base alloy, pure Cu, and a Cu-base alloy. However, in the case where the metallic material is used as an electrode, a fuel cell separator, or the like, pure Fe and a Fe-base alloy are not preferable from the viewpoint of corrosion resistance, and pure Co, a Co-base alloy, pure Cu, and a Cu-base alloy are not preferable from the viewpoint of cost and availability, in addition to corrosion resistance. In this case, preferable metallic materials as the base metal are ferritic stainless steel, austenitic stainless steel, two-phase stainless steel, pure Ti, and a Ti-base alloy.

As will be described later, in the case where transition metal(s) in the fourth period is(/are) contained in the base metal, the transition metal(s) can be included in the metal compound layer. In this case, it is preferred that more than or equal to 6 mass % of the transition metal(s) included in the metal compound layer be contained in the base metal.

[Metal Compound Layer]

The metal compound layer includes one or more of transition metals in the fourth period, that is, Ti, V, Cr, Mn, Fe, Co, Ni, and Cu.

Owing to such a metal compound layer, corrosion resistance can be enhanced while maintaining conductivity. The corrosion resistance is, for example, resistance to a fluorine-containing corrosive environment. Since a separator in a solid polymer electrolyte fuel cell is sometimes placed under the fluorine-containing corrosive environment, when the metallic material according to the present embodiment is applied to such a separator, increase in the contact resistance of the separator caused by corrosion products can be suppressed.

It is preferred that the transition metal(s) in the fourth period included in the metal compound layer be one or more of Ti, V, Cr, Mn, Fe, Ni, and Cu. In this case, the conductivity and the corrosion resistance can be made higher than the case where the metal(s) included in the metal compound layer is(/are) other than the above-mentioned metals. The compound included in the metal compound layer may also include element(s) other than the transition metals in the fourth period and other than oxygen. The metal compound layer may also include a compound of oxygen and element(s) other than the transition metals in the fourth period.

The thickness of the metal compound layer is not particularly limited. However, in order to attain sufficiently high corrosion resistance, the thickness of the metal compound layer is preferably more than or equal to 2 nm, and more preferably more than or equal to 3 nm. On the other hand, when the thickness of the metal compound layer exceeds 30 nm, the conductivity decreases remarkably, therefore, particularly in the case of being used as a fuel cell separator, it is necessary that the thickness be limited to less than or equal to 30 nm. For increasing the conductivity, it is preferred that the thickness be less than or equal to 20 nm. Observation (light field image) using a transmission electron microscope (TEM) reveals that the metal compound layer has a contrast that is different from the contrasts of the base metal, the platinum group portion, and the platinum group compound coating film. Accordingly, the thickness of the metal compound layer can be measured by the observation using TEM.

[Platinum Group Portion]

The platinum group elements are Ru, Rh, Pd, Os, Ir, and Pt. The platinum group portion includes one or more of those elements.

Dispersion of the platinum group portion on the metal compound layer ensures a low-resistant conductive path between a member with which the metallic material come into contact and the metal compound layer. That is, the contact resistance of the metallic material decreases. For example, in the case where the metallic material is used as a solid polymer electrolyte fuel cell separator, the contact resistance of the metallic material to the anode or the cathode of the fuel cell decreases, and hence, even when the fuel cell works for a long time, high conductivity can be maintained.

Regarding the platinum group elements, it is preferred that the proportion of one or more of Ru, Rh, Os, and Ir to the platinum group portion be more than 50 mass %. In this case, the forming of the platinum group compound coating film to be described later becomes easier than the case where the proportion of the other platinum group elements is more than 50 mass %, and in this way, the adhesion of the platinum group portion to the metal compound layer can be enhanced. In this case, it becomes possible to further suppress the increase in the contact resistance of the metallic material after the metallic material is subjected to bending.

The shape of the platinum group portion is not particularly limited, and may be, for example, a particle shape or a membrane shape.

An area proportion of the platinum group portion dispersed on the surface of the metal compound layer (hereinafter, referred to as "coverage") is not particularly limited, but is preferably more than or equal to 0.2%, and more preferably more than or equal to 1%. With such a coverage, the contact resistance of the metallic material can be decreased sufficiently. Further, the coverage is preferably less than or equal to 50%, and more preferably less than or equal to 40%. When the coverage exceeds those values, it becomes likely that cracks or peelings occur in the platinum group portion during a process, and the contact resistance of the metallic material increases. The coverage can be measured by, for example: observing the surface of the metallic material using a field emission scanning electron microscope (FE-SEM); performing analysis of a captured image, specifically, identifying an area in which the platinum group element(s) exists(/exist) at a concentration of a certain level or more and an area other than the former area; and determining an area proportion of the area of the higher concentration as the coverage.

[Platinum Group Compound Coating Film]

The platinum group compound coating film covers the platinum group portion, and works as a contact portion between the platinum group portion and the metal compound layer. In this way, peeling or falling off of the platinum group portion from the metal compound layer due to a process can be suppressed, and the low contact resistance of the metallic material can be maintained. The thickness of the platinum group compound coating film is not particularly limited, but is preferably more than or equal to 0.3 nm, and more preferably more than or equal to 0.5 nm. With such a thickness, sufficient adhesion force between the metal compound layer and the platinum group portion can be obtained. Further, the thickness of the platinum group compound coating film is preferably less than or equal to 15 nm, and more preferably less than or equal to 10 nm. With such a thickness, sufficiently high conductivity can be obtained. The thickness of the platinum group compound coating film can be measured by, for example, capturing a light field image of a portion including the platinum group portion and the platinum group compound coating film using TEM, and identifying the platinum group portion and the platinum group compound coating film by the difference in contrasts therebetween.

<Conductive Component>

The conductive component of the present embodiment includes the above metallic material. Examples of the conductive component include a separator for a fuel cell (for example, solid polymer electrolyte fuel cell) and an electrode (for example, electrode for an electrolytic device). The conductive component is obtained by processing the above metallic material, and has excellent conductivity.

<Method of Manufacturing Metallic Material>

The metallic material can be manufactured through a series of steps, for example, a preparation step of preparing a base metal, a metal compound layer-forming step of forming a metal compound layer on a surface of the base metal, a platinum group portion-placing step of placing a platinum group portion on the metal compound layer, and a platinum group compound coating film-forming step of forming a platinum group compound coating film on a surface of the platinum group portion. Hereinafter, each of the steps will be described.

[Preparation Step]

A metal base metal is prepared. The base metal can be obtained by processing a raw material which is an original source of the base metal, for example. The raw material may be, for example, a cast piece manufactured by a continuous casting process (including round continuous casting process), a slab manufactured by subjecting an ingot manufactured through an ingot making process to hot working, or a slab manufactured from a cast piece.

In order to obtain the base metal, the raw material is charged into a heating furnace or a soaking furnace, for example, and is heated. Subsequently, the heated raw material is subjected to hot working. The hot working may be, in the case of manufacturing a metal sheet, hot rolling, for example. Softening heat treatment is performed on the raw material which has been subjected to the hot working, and after that, in some cases, the raw material is subjected to cold working. The cold working may be, for example, cold rolling. By request, the raw material may have a shape other than the metal sheet, for example, may be processed into a shape of a round-bar, a square bar, a tube, or a line. By request, the surfaces of the raw materials having the respective shapes may each be processed into a shape other than the flat shape, for example, providing the surface with concavities and convexities. In this case, the concavities and convexities may be multiple minute projections (for example, each having a height of 0.1 to 3 μm). With the above step, the metal base metal is manufactured.

[Metal Compound Layer-Forming Step]

A metal compound layer is formed on a surface of the base metal prepared in the preparation step. The metal compound layer can be formed chemically or mechanically. Examples of chemical forming include heat treatment (thermal oxidation of an outer layer portion of the base metal), acid treatment, and plating. Examples of mechanical forming include fusion welding, thermal spraying, brazing and soldering, and pressure welding. Of those, heat treatment and acid treatment are suitable for mass production, and hence are preferred.

Since the metal compound layer contains transition metal(s) in the fourth period, in the case where the metal compound layer is formed by subjecting the base metal to heat treatment, it is necessary that the base metal contain the transition metal(s) in the fourth period. On the other hand, in the case where the metal compound layer is formed by a method that can add transition metal(s) in the fourth period to the surface of the base metal, for example, by plating or thermal spraying, the base metal does not necessarily contain a transition metal in the fourth period.

[Platinum Group Portion-Placing Step]

Regarding the metallic material (the base metal and the metal compound layer) which has undergone the metal compound layer-forming step, a platinum group portion is dispersed on a surface of the metal compound layer. The platinum group portion can be provided chemically or mechanically. Example of chemically providing the platinum group portion includes plating. Examples of mechanically providing the platinum group portion include fusion welding, brazing and soldering, and pressure welding. Of those, plating is suitable for mass production, and hence is preferred.

[Platinum Group Compound Coating Film-Forming Step]

Regarding the metallic material (the base metal, the metal compound layer, and the platinum group portion) which has undergone the platinum group portion-placing step, a platinum group compound coating film is formed on a surface of the platinum group portion. It is preferred that the platinum group compound coating film be formed chemically. Examples of chemical forming include heat treatment (thermal oxidation of an outer layer portion of the platinum group portion), acid treatment, and plating. Of those, heat treatment and acid treatment are suitable for mass production, and hence are preferred.

In the case where the platinum group compound coating film is formed by the heat treatment, it is preferred that conditions of the heat treatment be under an oxidizing atmosphere, a temperature range of 200 to 600° C., and a time range of 0.2 to 60 minutes. In this way, the outer layer portion of the platinum group portion is oxidized, and the platinum group compound coating film is formed.

When the heat treatment temperature is too low, oxidation of the outer layer portion of the platinum group portion does not sufficiently progress, and it is difficult to form the platinum group compound coating film. In this case, the adhesion between the metal compound layer and the platinum group portion does not improve. On the other hand, when the heat treatment temperature is too high, oxidation of the outer layer portion of the platinum group portion excessively progresses, and the contact resistance of the metallic material increases. Taking those into account, the range of the heat treatment temperature is more preferably 250 to 550° C.

When the heat treatment time is too short, oxidation of the outer layer portion of the platinum group portion does not sufficiently progress, and it is difficult to form the platinum group compound coating film. In this case, the adhesion between the metal compound layer and the platinum group portion does not improve. On the other hand, when the heat treatment time is too long, oxidation of the outer layer portion of the platinum group portion excessively progresses, and the contact resistance of the metallic material increases. Taking those into account, the range of the heat treatment time is more preferably 0.5 to 30 minutes. The appropriate heat treatment time varies depending on the heat treatment temperature.

The gas atmosphere composition during the heat treatment is not particularly limited as long as the outer layer portion of the platinum group portion is oxidized, but is preferably an atmosphere having a partial pressure of oxygen larger than the equilibrium dissociation pressure of the platinum group compound coating film.

The ease of oxidation of the platinum group element(s) depends on individual platinum group elements, therefore, it is necessary that an appropriate heat treatment condition be selected in accordance with the platinum group element(s) contained in the platinum group portion. In particular, since Pt among the platinum group elements is an element that is hardly oxidized, it is preferred that acid treatment and heat treatment be performed in combination. For example, chloroplatinic(IV) acid is produced on the surface of Pt using nitrohydrochloric acid, and then chloroplatinic(II) acid is produced through reduction treatment. The product is reacted with an aqueous solution of potassium hydroxide or the like, platinum hydroxide is produced. After that, the resultant is subjected to heat treatment to undergo dehydration treatment, and thus, platinum oxide can be obtained. Further, chloroplatinic(IV) acid is produced on the surface of Pt using nitrohydrochloric acid, and then with a reaction with sodium nitrate or the like, platinum oxide can be obtained via a platinum nitrate complex.

EXAMPLES

In order to be used as samples for checking the effects of the present invention, metal sheets were prepared, and contact resistances of before and after being subjected to repetitive bending (metal sheets which had not been subjected to bending and metal sheets which had been subjected to bending) were measured. Tables 1 to 4 show preparation conditions of respective metallic materials.

TABLE 1

| Category | Test No. | Base metal | Compound layer (A) | Thickness (nm) of (A) | Substance (B) | Dispersion coverage (%) of (B) |
|---|---|---|---|---|---|---|
| Example | 1 | Pure Ti (type 1) | Ti—O | 8.3 | Rh | 5.6 |
| Example | 2 | Ti-base alloy (type 11) | Ti—O | 15.8 | Ir | 7.9 |
| Example | 3 | Pure Co | Co—O | 24.7 | Rh | 0.5 |
| Example | 4 | Co-base alloy | Co—O | 15.3 | Os | 0.6 |
| Example | 5 | Pure Ni | Ni—O | 12.4 | Ru | 1.8 |
| Example | 6 | Ni-base alloy | Ni—Cr—O | 8.6 | Ru | 3.5 |
| Example | 7 | Ni-base alloy | Fe—Cr—O | 16.2 | Ir | 2.6 |
| Example | 8 | Pure Cu | Cu—O | 3.4 | Pt | 2.2 |
| Example | 9 | Cu-base alloy | Cu—O | 6.6 | Pd | 3.0 |
| Example | 10 | SUS410L | Fe—Cr—Mn—O | 5.1 | Ru | 7.4 |
| Example | 11 | SUS430J1L | Fe—Cr—O | 2.0 | Ru | 5.8 |
| Example | 12 | 9% Cr martensitic stainless steel | Fe—Cr—O | 1.9 | Ru | 9.4 |
| Example | 13 | SUS329J4L | Fe—Cr—O | 10.2 | Ru | 6.9 |
| Example | 14 | SUS410L | Fe—Cr—Mn—O | 10.0 | Ir | 5.1 |
| Example | 15 | SUS430J1L | Fe—Cr—O | 8.4 | Ir | 7.8 |
| Example | 16 | 9% Cr martensitic stainless steel | Fe—Cr—O | 12.6 | Ir | 2.7 |
| Example | 17 | SUS329J4L | Fe—Cr—O | 5.5 | Ir | 7.2 |
| Example | 18 | SUS316L | Fe—Cr—Mn—O | 7.8 | Os | 6.9 |
| Example | 19 | SUS316L | Fe—Cr—O | 10.4 | Ir | 8.8 |
| Example | 20 | SUS316L | Fe—Cr—Ni—O | 8.3 | Ru | 5.8 |
| Example | 21 | SUS316L | Fe—Cr—Mn—O | 10.1 | Rh | 9.9 |
| Example | 22 | SUS316L | Fe—Cr—Mn—O | 5.7 | Pd | 14.2 |
| Example | 23 | SUS316L | Fe—Cr—Mn—O | 4.8 | Pt | 16.1 |
| Example | 24 | SUS316L | Fe—Cr—Mn—O | 8.8 | Ru, Ir | 7.7 |
| Example | 25 | Pure Ti (type 2) | Ti—O | 11.4 | Ru | 5.6 |
| Example | 26 | Pure Ti (type 2) | Ti—O | 8.1 | Pt | 20.1 |
| Example | 27 | Pure Ti (type 2) | Ti—O | 6.6 | Pd | 24.2 |
| Example | 28 | Pure Ti (type 2) | Ti—O | 8.9 | Rh | 8.7 |
| Example | 29 | Pure Ti (type 2) | Ti—O | 4.7 | Os | 6.6 |
| Example | 30 | Pure Ti (type 2) | Ti—O | 13.5 | Ir | 5.6 |

TABLE 2

| Category | Test No. | Base metal | Compound layer (A) | Thickness (nm) of (A) | Substance (B) | Dispersion coverage (%) of (B) |
|---|---|---|---|---|---|---|
| Example | 31 | Ti-base alloy (type 17) | Ti—O | 3.8 | Ru | 4.9 |
| Example | 32 | Ti-base alloy (type 19) | Ti—O | 11.4 | Ru | 5.3 |
| Example | 33 | Ti-base alloy (type 21) | Ti—O | 14.3 | Ru | 7.2 |
| Example | 34 | Pure Ti (type 1) | Ti—O | 12.2 | Ru | 28.4 |
| Example | 35 | Pure Ti (type 1) | Ti—O | 10.8 | Ru | 4.1 |
| Example | 36 | Pure Ti (type 1) | Ti—O | 10.2 | Ru | 6.4 |
| Example | 37 | Pure Ti (type 1) | Ti—O | 14.8 | Ru | 3.9 |
| Example | 38 | Pure Ti (type 1) | Ti—O | 12.9 | Rh | 22.8 |
| Example | 39 | Pure Ti (type 1) | Ti—O | 6.7 | Rh | 0.9 |
| Example | 40 | Pure Ti (type 1) | Ti—O | 5.9 | Rh | 12.3 |
| Example | 41 | Pure Ti (type 1) | Ti—O | 8.0 | Rh | 3.1 |
| Example | 42 | Pure Ti (type 2) | Ti—O | 10.4 | Os, Rh, Ir | 11.5 |
| Example | 43 | Pure Ti (type 2) | Ti—O | 11.2 | Ru, Os | 4.5 |
| Example | 44 | Pure Ti (type 2) | Ti—O | 8.3 | Ru, Rh | 13.4 |
| Example | 45 | Pure Ti (type 2) | Ti—O | 7.8 | Ru, Rh, Ir | 10.2 |
| Example | 46 | Pure Ti (type 2) | Ti—O | 10.5 | Ru, Rh, Ir, Os | 5.6 |
| Example | 47 | Pure Ti (type 1) | Ti—O | 11.8 | Ru | 7.2 |
| Example | 48 | Pure Ti (type 1) | Ti—O | 8.0 | Ru | 8.8 |

TABLE 2-continued

| Category | Test No. | Base metal | Compound layer (A) | Thickness (nm) of (A) | Substance (B) | Dispersion coverage (%) of (B) |
|---|---|---|---|---|---|---|
| Example | 49 | Pure Ti (type 1) | Ti—O | 6.9 | Ru | 6.7 |
| Example | 50 | Pure Ti (type 1) | Ti—O | 7.2 | Ru | 7.7 |
| Comparative Example | 51 | Pure Ti (type 1) | Ti—O | 10.6 | — | 0.0 |
| Comparative Example | 52 | Pure Ti (type 1) | Ti—O | 7.7 | Ru | 6.6 |
| Comparative Example | 53 | 18Cr—3Al | Al—O | 3.6 | Rh | 12.4 |
| Comparative Example | 54 | 13Cr—1.5Si—Nb | Si—O | 5.1 | Ru | 10.3 |
| Comparative Example | 55 | SUS430J1L | Fe—Cr—O | 7.3 | — | 0.0 |
| Comparative Example | 56 | SUS430J1L | Fe—Cr—O | 10.7 | Ir | 7.9 |
| Comparative Example | 57 | Pure Ti (type 2) | Ti—O | 3.0 | Pt | 74.3 |
| Comparative Example | 58 | Pure Ti (type 2) | Ti—O | 5.1 | Pt | 100.0 |
| Comparative Example | 59 | Pure Ti (type 2) | Ti—O | 8.3 | Pt | 44.3 |
| Comparative Example | 60 | Pure Ti (type 2) | Zr—O | 225.0 | Pt | 100.0 |
| Comparative Example | 61 | Pure Ti (type 2) | Ti—O | 100.0 | Pt | 100.0 |
| Comparative Example | 62 | Pure Ti (type 2) | Ti—O | 42.5 | Pt | 100.0 |

TABLE 3

| Category | Test No. | Step of covering with compound (C) | | | | | Contact resistance value (m$\Omega \cdot$ cm$^2$) | |
|---|---|---|---|---|---|---|---|---|
| | | Heat treatment | Platinum group element(s) | Heat treatment temperature (° C.) | Heat treatment time (min) | Thickness (nm) of (C) | Bending not performed | Bending performed |
| Example | 1 | Yes | Rh | 300 | 10 | 1.6 | 4.3 | 4.6 |
| Example | 2 | Yes | Ir | 440 | 6 | 3.5 | 4.7 | 4.8 |
| Example | 3 | Yes | Rh | 420 | 6 | 3.1 | 7.5 | 7.6 |
| Example | 4 | Yes | Os | 270 | 20 | 2.1 | 7.4 | 7.5 |
| Example | 5 | Yes | Ru | 350 | 10 | 2.8 | 6.6 | 6.9 |
| Example | 6 | Yes | Ru | 350 | 10 | 2.6 | 6.0 | 6.5 |
| Example | 7 | Yes | Ir | 480 | 15 | 1.6 | 6.5 | 7.4 |
| Example | 8 | Yes | Pt | 500 | 10 | 1.5 | 6.4 | 7.6 |
| Example | 9 | Yes | Pd | 520 | 15 | 1.8 | 6.1 | 7.7 |
| Example | 10 | Yes | Ru | 320 | 10 | 1.9 | 5.3 | 5.2 |
| Example | 11 | Yes | Ru | 330 | 12 | 2.0 | 4.3 | 4.7 |
| Example | 12 | Yes | Ru | 380 | 3 | 2.8 | 5.1 | 5.6 |
| Example | 13 | Yes | Ru | 350 | 15 | 2.8 | 4.5 | 4.8 |
| Example | 14 | Yes | Ir | 440 | 15 | 3.7 | 5.6 | 5.9 |
| Example | 15 | Yes | Ir | 480 | 10 | 4.3 | 4.6 | 4.9 |
| Example | 16 | Yes | Ir | 420 | 12 | 3.2 | 5.6 | 5.7 |
| Example | 17 | Yes | Ir | 350 | 5 | 2.3 | 4.8 | 5.3 |
| Example | 18 | Yes | Os | 350 | 2 | 3.7 | 4.9 | 5.4 |
| Example | 19 | Yes | Ir | 440 | 10 | 3.6 | 4.2 | 4.6 |
| Example | 20 | Yes | Ru | 270 | 20 | 1.4 | 4.0 | 4.1 |
| Example | 21 | Yes | Rh | 330 | 20 | 1.8 | 4.3 | 4.5 |
| Example | 22 | Yes | Pd | 460 | 20 | 1.4 | 3.9 | 6.2 |
| Example | 23 | Yes | Pt | 490 | 30 | 1.4 | 4.2 | 6.4 |
| Example | 24 | Yes | Ru, Ir | 350 | 10 | 3.0 | 3.9 | 4.3 |
| Example | 25 | Yes | Ru | 320 | 7 | 1.7 | 3.5 | 3.6 |
| Example | 26 | Yes | Pt | 460 | 20 | 0.8 | 3.2 | 6.2 |
| Example | 27 | Yes | Pd | 540 | 7 | 1.9 | 3.5 | 6.8 |
| Example | 28 | Yes | Rh | 410 | 12 | 3.5 | 3.6 | 3.6 |
| Example | 29 | Yes | Os | 450 | 0.5 | 7.4 | 4.2 | 4.8 |
| Example | 30 | Yes | Ir | 450 | 12 | 3.9 | 3.8 | 4.2 |

TABLE 4

| | | | Step of covering with compound (C) | | | | | |
|---|---|---|---|---|---|---|---|---|
| | | | | Heat | Heat | | Contact resistance | |
| | | | Platinum | treatment | treatment | Thickness | value (mΩ · cm$^2$) | |
| | Test | Heat | group | temperature | time | (nm) | Bending not | Bending |
| Category | No. | treatment | element(s) | (° C.) | (min) | of (C) | performed | performed |
| Example | 31 | Yes | Ru | 300 | 25 | 1.9 | 3.5 | 3.8 |
| Example | 32 | Yes | Ru | 400 | 10 | 3.3 | 3.8 | 4.0 |
| Example | 33 | Yes | Ru | 500 | 1 | 5.7 | 3.9 | 4.1 |
| Example | 34 | Yes | Ru | 220 | 20 | 0.5 | 3.6 | 7.5 |
| Example | 35 | Yes | Ru | 570 | 10 | 7.4 | 6.3 | 6.7 |
| Example | 36 | Yes | Ru | 300 | 0.3 | 1.3 | 3.8 | 6.7 |
| Example | 37 | Yes | Ru | 480 | 60 | 5.3 | 6.1 | 6.5 |
| Example | 38 | Yes | Rh | 240 | 20 | 0.6 | 4.1 | 7.4 |
| Example | 39 | Yes | Rh | 580 | 5 | 9.4 | 7.2 | 7.5 |
| Example | 40 | Yes | Rh | 300 | 0.2 | 1.0 | 4.0 | 6.4 |
| Example | 41 | Yes | Rh | 470 | 45 | 5.9 | 6.2 | 6.6 |
| Example | 42 | Yes | Os, Rh, Ir | 400 | 15 | 4.6 | 3.9 | 4.3 |
| Example | 43 | Yes | Ir, Os | 420 | 7 | 4.2 | 4.4 | 4.5 |
| Example | 44 | Yes | Ru, Rh | 350 | 10 | 2.4 | 3.7 | 3.8 |
| Example | 45 | Yes | Ru, Pt, Rh | 400 | 20 | 3.1 | 3.6 | 3.9 |
| Example | 46 | Yes | Ru, Rh, Ir, Os | 450 | 5 | 4.8 | 4.0 | 4.4 |
| Example | 47 | Yes | Ru | 180 | 20 | 0.3 | 3.4 | 9.1 |
| Example | 48 | Yes | Ru | 650 | 5 | 13.4 | 9.2 | 9.4 |
| Example | 49 | Yes | Ru | 300 | 0.1 | 0.4 | 3.4 | 9.2 |
| Example | 50 | Yes | Ru | 480 | 75 | 11.8 | 8.7 | 9.3 |
| Comparative Example | 51 | No | — | — | — | 0.0 | 15.9 | — |
| Comparative Example | 52 | No | — | — | — | 0.0 | 3.7 | 13.8 |
| Comparative Example | 53 | Yes | Rh | 550 | 30 | 5.5 | >50 | >50 |
| Comparative Example | 54 | Yes | Ru | 550 | 30 | 6.1 | >50 | >50 |
| Comparative Example | 55 | No | — | — | — | 0.0 | 20.5 | — |
| Comparative Example | 56 | No | — | — | — | 0.0 | 5.3 | 14.5 |
| Comparative Example | 57 | No | — | — | — | 0.0 | 3.9 | 17.5 |
| Comparative Example | 58 | No | — | — | — | 0.0 | 3.1 | 19.2 |
| Comparative Example | 59 | No | — | — | — | 0.0 | 3.6 | 14.1 |
| Comparative Example | 60 | Yes | Ir, Ta | 500 | 60 | 100.0 | 22.3 | 34.5 |
| Comparative Example | 61 | Yes | Ir | 490 | 60 | 53.0 | 15.4 | 26.7 |
| Comparative Example | 62 | Yes | Pt | 490 | 60 | 48.5 | 12.5 | 20.4 |

(Note)
"—" represents unadministered

1. Preparation of Metal Sheet

A metal sheet (foil), which had been rolled to have a thickness of 0.1 mm and then had subjected to annealing, was prepared, and, using the metal sheet as a base metal, treatment of forming a metal compound layer on a surface of the metal sheet was performed. The metal compound layers were formed by: subjecting the metal sheets of Test Nos. 3, 5, 18, and 19 to heat treatment, subjecting the metal sheet of Test No. 7 to low velocity thermal spraying, and subjecting the metal sheets of the test numbers other than the above to acid treatment. In Table 1 and Table 2, "compound layer (A)" has a proportion of a compound of the relevant element(s) (metal(s)) and oxygen to the metal compound layer of more than 50 vol %.

Regarding the metal sheets of Test Nos. 53, 54, and 60, no metal compound layer defined in the present invention was formed. Although metal compound layers were formed on the surfaces of those metal sheets, the metal compound layers did not substantially contain a transition metal in the fourth period. Further, those base metals also did not substantially contain a transition metal in the fourth period.

Regarding the metal sheets of Test Nos. 61 and 62, thick metal compound layers having thicknesses of 100 nm and 42.5 nm, respectively, were formed. The metal sheet of Test No. 60 did not contain a transition metal in the fourth period, and in addition, formed a thick metal compound layer whose thickness was 225 nm.

The base metal of the metal sheet of Test No. 7 did not substantially contain a transition metal in the fourth period, but formed a metal compound layer containing transition metals through a low velocity thermal spraying method (arc thermal spraying method).

Next, the metal sheets of other than Test Nos. 51 and 55 were each subjected to treatment of dispersing and placing the platinum group portion on the metal compound layer. Dispersing and placing of the platinum group portions were performed by pressure welding for the metal sheets of Test Nos. 8, 11, and 12, and by plating for the metal sheets of the test numbers other than those. Regarding the metal sheets of Test Nos. 51 and 55, no platinum group portion was placed on the metal compound layers. In Table 1 and Table 2, "substance (B)" has a proportion of the relevant element(s) to the platinum group portion of more than 50 mass %.

After that, of the metal sheets on which the platinum group portions were dispersed and placed, respectively, for each of the metal sheets of other than Test Nos. 52 and 56 to 59, a platinum group compound coating film (oxide film) was formed on the outer layer portion of the platinum group portion through heat treatment. The metal sheets of Test Nos. 52 and 56 to 59 were not subjected to heat treatment, and no platinum group compound coating film was formed on the platinum group portions.

Regarding each of the metal sheets of Test Nos. 60 and 61, before the coverage with the substance (B), a compound (C) was formed. That is, a mixed liquid of 2.47 g of iridium trichloride trihydrate, 1.22 g of tantalum(V) ethoxide, 98 ml of isopropanol, and 2 ml of cyclohexanol was prepared, and was applied to the upper surface of the compound layer (A). After that, a metal compound (C) made of Ir—O and Ta—O was formed through heat treatment, and the upper surface thereof was covered with Pt, which was the substance (B). In this way, the compound (C) did not cover the substance (B).

Regarding the metal sheet of Test No. 62, before the coverage with the substance (B), the compound (C) was formed. That is, chloroplatinic(IV) acid was produced on the surface of Pt using nitrohydrochloric acid, and then was reduced to chloroplatinic(II) acid. Subsequently, chloroplatinic(II) acid was reacted with potassium hydroxide aqueous solution, and the resultant was applied to the upper surface of the compound layer (A). After that, an intermetallic compound (C) made of Pt—O was formed through heat treatment, and the upper surface thereof was covered with Pt, which was the substance (B). In this way, the compound (C) did not cover the substance (B).

As described above, each of the metal sheets of Test Nos. 51 to 62 did not satisfy at least one of the requirements of the metallic material according to the present invention.

2. Evaluation of Metal Sheet

For each of the obtained metal sheets, the thickness of the metal compound layer was measured. To be specific, TEM was used at 1000000-fold magnification, observation was performed at three visual fields, thicknesses of the metal compound layer were measured at three points for each visual field, and the average of the thicknesses at nine points in total was determined. Table 1 and Table 2 show thicknesses of the metal compound layers thus measured. Further, during the observation using TEM, it was confirmed that the platinum group compound coating film was also formed between the platinum group portion and the metal compound layer, that is, the platinum group compound coating film had a portion in contact with the metal compound layer.

Further, for each of the obtained metal sheets, the thickness of the platinum group compound coating film was measured. To be specific, TEM was used at 1000000-fold magnification, observation was performed at three visual fields, thicknesses of the platinum group compound coating film were measured at three points for each visual field, and the average of the thicknesses at nine points in total was determined. Table 3 and Table 4 show thicknesses of the platinum group compound coating films thus measured.

In addition, for each of the obtained metal sheets, contact resistances of before and after being subjected to bending were measured. However, regarding each of the metal sheets of Test Nos. 51 and 55, since no platinum group portion was formed and the contact resistance at an initial stage was high, the contact resistance after bending was not measured for those metal sheets. Bending was performed in accordance with the method defined in JIS H3510, and a process of bending a metal sheet 90° and then bringing back to a flat sheet shape using a die having a radius of 1 mm was repeated 10 times.

To be used for the measurement of contact resistance, a small piece having a thickness of 0.1 mm, a length of 10 mm, and a width of 10 mm was cut out from each of an area that had been subjected to bending and an area that had not been subjected to bending in the metal sheet. The small piece cut out from the area that had been subjected to bending corresponds to the metal sheet after bending. The small piece cut out from the area that had not been subjected to bending corresponds to the metal sheet before bending.

Figure 2:
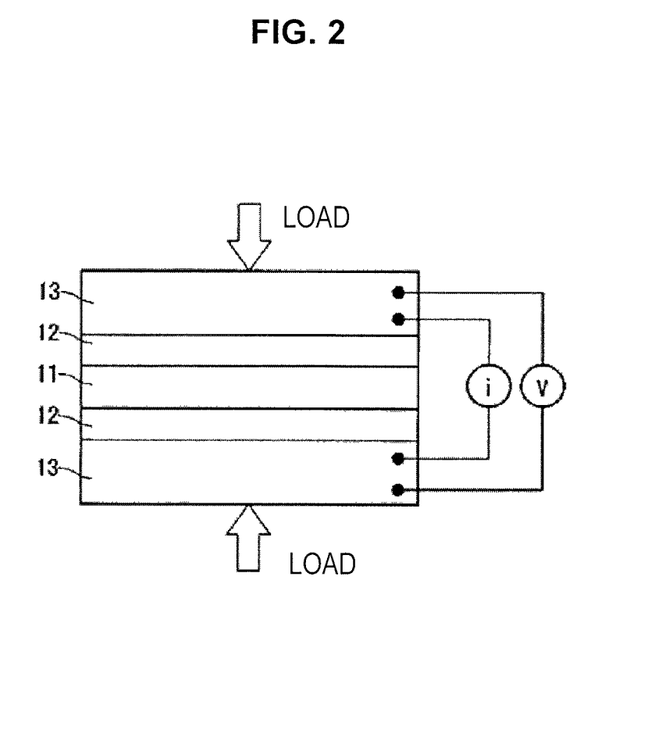
FIG. 2 is a diagram illustrating a method of measuring contact resistance.

FIG. 2 is a diagram illustrating a method of measuring contact resistance. The contact resistance was measured using a device schematically shown in FIG. 2. To be specific, first, a metal sheet 11, which was a measurement target, was sandwiched by two pieces of carbon paper (TGP-H-90, manufactured by Toray Industries, Inc.) 12 having an area of 1 cm$^2$ used for gas diffusion layers (anode 3 and cathode 4 shown in FIG. 1) of a solid polymer electrolyte fuel cell, and the resultant was sandwiched by two gold-plated electrodes 13. Next, a process of sending a certain amount of electrical current to both ends of the gold-plated electrodes 13, applying pressure (10 kgf/cm$^2$) for 10 seconds, and immediately after that, performing unloading, was repeated 20 times, the voltage drop between the carbon paper 12 and the metal sheet 11 to occur thereafter was measured, and, on the basis of the result, a resistance value was determined. Since the obtained resistance value was a total of the contact resistances of the respective surfaces of the metal sheet 11, the obtained resistance value was divided by 2, and the result was regarded as a contact resistance value per surface of the metal sheet 11.

A metal sheet having a contact resistance value of less than or equal to 10 m$\Omega \cdot$cm$^2$ was determined as pass, and thus, the quality was determined. Hereinafter, regarding the contact resistance, "low" represents the contact resistance value of less than or equal to 10 m$\Omega \cdot$cm$^2$, and "high" represents the contact resistance value of more than 10 m$\Omega \cdot$cm$^2$.

Table 3 and Table 4 show contact resistance values of metal sheets of before and after being subjected to bending.

Regarding each of the metal sheets of Test Nos. 1 to 50, which are Examples, contact resistances of before and after being subjected to bending were low, and the difference between the contact resistances of before and after being subjected to bending was small. On the other hand, regarding each of the metal sheets of Test Nos. 51 to 62, which are Comparative Examples, contact resistances of before and after being subjected to bending were high or the contact resistance of after being subjected to bending was high, and they did not satisfy a pass standard of the contact resistance value.

Regarding each of the metal sheets of Test Nos. 51 and 55, the contact resistance of before being subjected to bending was high. It can be considered that this was because a platinum group portion was not provided on the surface of the metal compound layer. Regarding each of the metal sheets of Test Nos. 52 and 56, the contact resistance of before being subjected to bending was low, but the contact resistance of after being subjected to bending was high. It can be considered that this was because, since the platinum group compound coating film was not formed on the surface of the platinum group portion, the adhesion between the platinum group portion and the metal compound layer was not sufficient, and the platinum group portion fell off during bending. Regarding each of the metal sheets of Test Nos. 53 and 54, the contact resistances of before and after being subjected to bending were high. It can be considered that this was because, since the metal compound layer was a compound of oxygen and metal(s) other than the transition metals in the fourth period, the electric resistance of the metal compound layer itself was high. Regarding each of the metal sheets of Test Nos. 57 to 59, the contact resistance of before being subjected to bending was low, but the contact resistance of after being subjected to bending was high. It can be considered that this was because, since the platinum group compound coating film was not formed on the surface of the platinum group portion, the adhesion between the platinum group portion and the metal compound layer was not sufficient, and the platinum group portion fell off during bending. Regarding each of the metal sheets of Test Nos. 60 to 62, the contact resistance of before being subjected to bending was high. In addition, the contact resistance of after being subjected to bending was extremely high. It can be considered that this was because, since the thickness of the metal compound layer was as large as more than or equal to 40 nm, the conductivity decreased, and additionally, the platinum group portion fell off during bending.

INDUSTRIAL APPLICABILITY

The metallic material according to the present invention can be used for a conductive component in which excellent conductivity is demanded, such as a fuel cell separator and an electrode.

REFERENCE SIGNS LIST 5a, 5b separator 11 metal sheet

The invention claimed is:
1. A metallic material comprising:
a base metal made of a metal;
a metal compound layer stacked on a surface of the base metal, the metal compound layer mainly containing a compound of at least one transition metal in the fourth period and oxygen, the at least one transition metal in the fourth period being selected from the group consisting of Ti, V, Cr, Mn, Fe, Co, Ni, and Cu;
a platinum group portion dispersed on a surface of the metal compound layer, the platinum group portion mainly containing at least one platinum group element; and
a platinum group compound coating film which covers the platinum group portion, the platinum group compound coating film mainly containing a compound of at least one platinum group element and oxygen,
wherein an area proportion of the platinum group portion dispersed on the surface of the metal compound layer is more than or equal to 0.2%, and less than or equal to 50%,
the metal compound layer has thickness from more than or equal to 2 nm to less than or equal to 30 nm, and
the platinum group compound coating film has thickness from more than or equal to 0.3 nm to less than or equal to 15 nm.
2. The metallic material according to claim 1,
wherein the at least one platinum group element contained in the platinum group portion includes one or more of Ru, Rh, Os, and Ir.
3. A conductive component comprising the metallic material according to claim 1.
4. A conductive component comprising the metallic material according to claim 2.
5. A fuel cell separator comprising the metallic material according to claim 1.
6. A fuel cell separator comprising the metallic material according to claim 2.
7. An electrode comprising the metallic material according to claim 1.
8. An electrode comprising the metallic material according to claim 2.

* * * * *